US012764651B2

(12) United States Patent
Reis et al.

(10) Patent No.: US 12,764,651 B2
(45) Date of Patent: Oct. 13, 2026

(54) DETERMINING THE TRANSMISSION POWER FOR A MOBILE DEVICE

(71) Applicant: Higher Ground LLC, Palo Alto, CA (US)

(72) Inventors: Darren Robert Reis, Palo Alto, CA (US); David Alexander Reuss, San Leandro, CA (US); Shmuel Shaffer, Palo Alto, CA (US); Robert S. Reis, Palo Alto, CA (US)

(73) Assignee: Higher Ground LLC, Palo Alto, CA (US)

(*) Notice: Subject to any disclaimer, the term of this patent is extended or adjusted under 35 U.S.C. 154(b) by 621 days.

(21) Appl. No.: 18/095,486

(22) Filed: Jan. 10, 2023

(65) Prior Publication Data

US 2023/0262596 A1 Aug. 17, 2023

Related U.S. Application Data

(60) Provisional application No. 63/298,076, filed on Jan. 10, 2022.

(51) Int. Cl.
*H04W 48/20* (2009.01)
*H04W 52/36* (2009.01)
*H04W 84/06* (2009.01)

(52) U.S. Cl.
CPC ......... *H04W 48/20* (2013.01); *H04W 52/367* (2013.01); *H04W 84/06* (2013.01)

(58) Field of Classification Search
CPC .... H04W 48/20; H04W 52/367; H04W 84/06
See application file for complete search history.

(56) References Cited

U.S. PATENT DOCUMENTS 5,768,684 A * 6/1998 Grubb .................. H04W 52/20 455/12.1
6,272,325 B1 * 8/2001 Wiedeman ......... H04B 7/18543 455/26.1

(Continued)

FOREIGN PATENT DOCUMENTS

WO WO-2022089310 A1 * 5/2022 ............... G06T 7/70

*Primary Examiner* — Kevin T Bates
*Assistant Examiner* — Jaeyoung Kwak
(74) *Attorney, Agent, or Firm* — Lee & Hayes, P.C.

(57) ABSTRACT

Systems and techniques herein provide for determining the transmission power for a mobile device. In particular, techniques herein automatically set the transmission power of a radio so as to minimize the detectability of the transmitter (that is, by minimizing the radio signature of the communication), and consequently to also minimize the necessary transmission power. In addition, the reduction in transmission power prolongs the life of the battery, or similarly, facilitates using smaller and lighter batteries. In one embodiment, satellite communication in the presence of an adversary comprises evaluating multiple communication satellites in order to select the specific satellite that provides a communication path with minimal exposure of the communications to the adversary. The transmission power of the mobile device may then be set to ensure proper communication to the specific satellite while minimizing the power received by the adversary (or a potential adversary).

20 Claims, 7 Drawing Sheets

(56) References Cited

U.S. PATENT DOCUMENTS

| | | | | |
|---|---|---|---|---|
| 6,628,921 | B1 * | 9/2003 | Vaddiparty | H04B 7/1851 455/452.2 |
| 2009/0022088 | A1 * | 1/2009 | Wahlberg | H04B 7/18532 370/321 |
| 2021/0165105 | A1 * | 6/2021 | Rhee | H04B 7/18517 |
| 2022/0368411 | A1 * | 11/2022 | Speidel | H04B 7/18513 |
| 2023/0400326 | A1 * | 12/2023 | Zhang | G01C 21/38 |

* cited by examiner

DETERMINING THE TRANSMISSION POWER FOR A MOBILE DEVICE

RELATED APPLICATION

This application claims priority to U.S. Prov. Appl. No. 63/298,076, filed on Jan. 10, 2022, entitled DETERMINING THE TRANSMISSION POWER FOR A MOBILE DEVICE, Darren Robert Reis, et al., the contents of which are incorporated herein by reference.

TECHNICAL FIELD

The present disclosure relates generally to wireless communication systems, and, more particularly, to determining the transmission power for a mobile device.

BACKGROUND

Success of stealth operations depends greatly on not being recognized by adversaries. In particular, when a stealth operation is conducted, the operation may be compromised by an adversary detecting a radio signature from transmitting equipment.

SUMMARY

According to one or more of the embodiments herein, systems and techniques is provide for determining the transmission power for a mobile device. In particular, a system in accordance with the techniques herein automatically sets the transmission power of a radio so as to minimize the detectability of the transmitter (that is, by minimizing the radio signature of the communication), and consequently to also minimize the necessary transmission power. In addition, the reduction in transmission power prolongs the life of the battery, or similarly, facilitates using smaller and lighter batteries. In one embodiment, satellite communication in the presence of an adversary comprises evaluating multiple communication satellites in order to select the specific satellite that provides a communication path with minimal exposure of the communications to the adversary. The transmission power of the mobile device may then be set to ensure proper communication to the specific satellite while minimizing the power received by the adversary (or a potential adversary).

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, the success of a stealth operation depends on the ability of the operators to remain undetected, including preventing the adversary from being able to detect a radio signature from the operators. To this end, maintaining the lowest transmission power at all times is essential, especially when maintaining radio silence is not feasible.

Commercially available systems such as mobile phones employ automated power setting method. This method relies on the mobile phone to first associate itself with a cellular tower (or a base station). Once the mobile phone is in communication with the cellular tower, the tower measures the power it receives from the cellular phone and if indicated it instructs the mobile phone to adjust (either increase or decrease) its is transmission power. Usually, the mobile phone starts the communication using higher power as to ensure that the cellular tower can receive the communication from the cellular phone with higher signal quality (higher SNR). While the cellular power adjustment works well for cellular communication, it is not suited for stealth operations because the cellular algorithm starts by transmitting high and potentially prohibited power.

Another technique to ensure that the initial transmission towards the satellite link uses the lowest possible transmission power starts with initial lowest transmission power. If the satellite (and the associated ground station) can detect this low signal level, transmission is established. However, if the mobile device, using this low transmission level, cannot establish communication link via the satellite, the mobile device increases the transmission to the next power level. The process continues until communication is established. While this process may result in the lowest possible transmission power, the process is very time consuming. For example, when a message travels from a mobile device via a satellite to a ground station and echoed back to the mobile device, for a geostationary orbit or geosynchronous equatorial orbit (GEO) satellite, the round trip takes about 0.5 seconds. When the establishment of the communication channel involves more than a single message exchange, the process of establishing a communication channel may, and usually does, take a few seconds. Therefore, attempting to establish a communication channel using ever increasing transmission power would involve multiple attempts at different transmission powers, each one of them consuming multiple seconds, making this a time consuming process.

The techniques herein, therefore, provide for a robust and efficient communication technique for determining the transmission power for a mobile device that selects a satellite to facilitate communication using the lowest transmission power, while enabling a prompt establishment of a communication channel without requiring transmission of high powered signals.

Figure 1A:
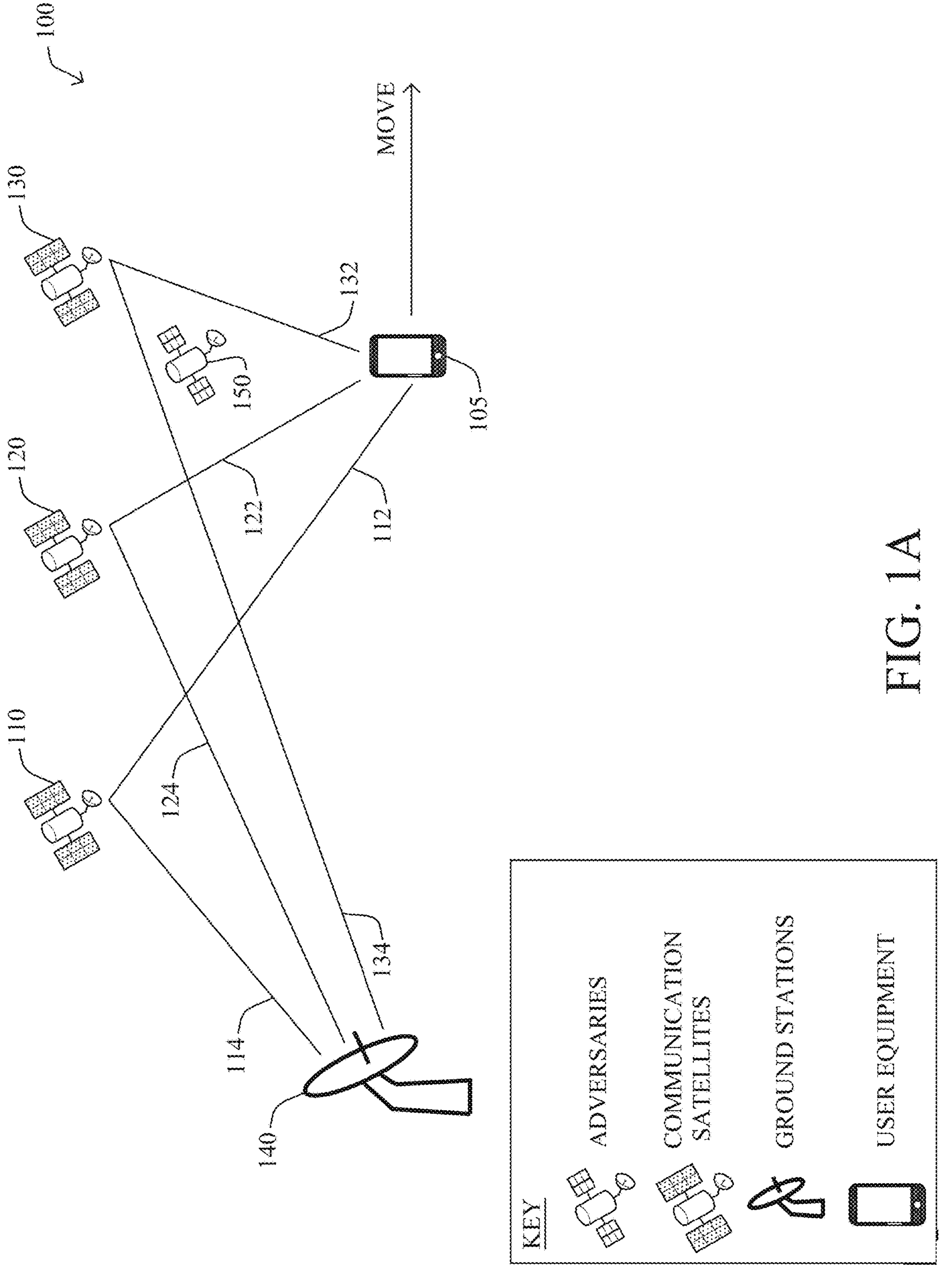
FIG. 1A illustrates an example communication system, for example, for satellite communication in the presence of an adversary.

FIG. 1A illustrates an example of a communication environment 100 using a satellite link in the presence of an adversary. Illustratively, user equipment 105 (e.g., a terminal, mobile device, "SatCom" device, and so on) attempts to establish communication with ground station 140. Communications can be established via one of the communication satellites, e.g., communication satellite 110 using communication paths 112 and 114, communication satellite 120 using communication path 122 and 124, or communication satellite 130 using communication paths 132 and 134. In one embodiment, operation of an antenna (e.g., a small aperture antenna) of the user equipment 105 may be based on pointing in specific directions substantially towards the desired satellite and, therefore, the gain of the small aperture antenna is sufficient to accommodate the satellite communication (e.g., where the small aperture antenna's radiation pattern may comprise a main lobe and respective side lobes). Accordingly, the gain of the antenna towards an unintended receiver (e.g., an adversary, such as a satellite 150 as shown, or other adversaries such as drones, airplanes, radio towers, etc.) is small enough as to prevent detection of the operations of the user equipment 105 (e.g., main and side lobes), while providing sufficient gain towards the intended target satellite, as described in greater detail below.

In accordance with one example implementation, the user equipment 105 knows its location, e.g., based on global positioning system (GPS) or otherwise, as well as the location of the available communication satellites, e.g., the locations of satellites 110, 120, and 130. For example, when the communication satellites are GEO satellites, the substantially static locations of these satellites are known. Similarly, for low earth orbit (LEO) or medium earth orbit (MEO) satellites, the location of these moving satellites which varies with time, can be calculated or otherwise obtained from pre-calculated tables. The location of the ground station is also well known.

Using the abovementioned known distances, and the sensitivity of the receiver at the ground station, the system calculates the minimal power it needs to transmit to ensure that the power of signal the (originating at the user equipment 105 and received at the ground station 140) has sufficient power that accommodates proper reception at the ground station 140. Note that in one embodiment, the power of the signal received at the ground station depends on the power transmitted from the user equipment, and thus the is calculation accounts for the selected satellite and its relay to the ground station. In another embodiment, the selected satellite adjusts/amplifies ("boosts") the power to ensure that the ground station always receives proper power regardless of the power transmitted by the user equipment, and as such, the calculation need only ensure that the intended satellite can receive the signal, accordingly.

In accordance with one embodiment herein, the system may use a user interface to guide the user to point the antenna of the user equipment towards the satellite through which the user equipment 105 can communicate while using the minimal power as calculated to ensure proper reception by the ground station, thus limiting the transmitter power of the user equipment to operate only at the identified power.

In accordance with yet another embodiment herein, the user of user equipment 105 identifies an adversary listening device such as a drone (or direction from which an adversary may be listening). For the sake of simplicity, the adversary that is illustrated in FIG. 1A is a satellite, but those skilled in the art should recognize that the same teachings equally apply to airborne adversaries, e.g., an airplane or a drone, or to ground equipment located at a specific direction, and so on. User interfaces, such as those illustrated in FIGS. 3A-4 and described in greater detail below, enable the user to enter the direction in which the adversary may be, or is located. The system therefore determines the direction (or directions) of the adversary and stores it in its memory. In accordance with a specific aspect of the techniques herein, the user interface may also allow the user to track a moving object such as an airborne adversary, determine the angular speed of the adversary, and predict the direction in which the adversary will be in the near future (e.g., at or near the time of transmission by the user equipment).

When the user attempts to associate its communication device with a communication satellite, e.g., one of satellites 110, 120, or 130, the communication device determines a length of the communication path associated with each one of the potential communication satellites as well as the gain of the antennas of the various satellites towards the location at which the mobile device is located. The required transmission power from the mobile device 105 to ensure proper communication with each of the satellites is determined based on the length of the travel path via the identified satellite (e.g., to the satellite alone, or to the satellite and back to the ground station, as noted above) as well as the gain of the antennas of the various satellites towards the location at which the mobile device is located.

In accordance with one example embodiment, the user interface then guides the user to point the antenna of the mobile device towards the satellite through which the mobile device can communicate using the lowest transmission power.

Figure 1B:
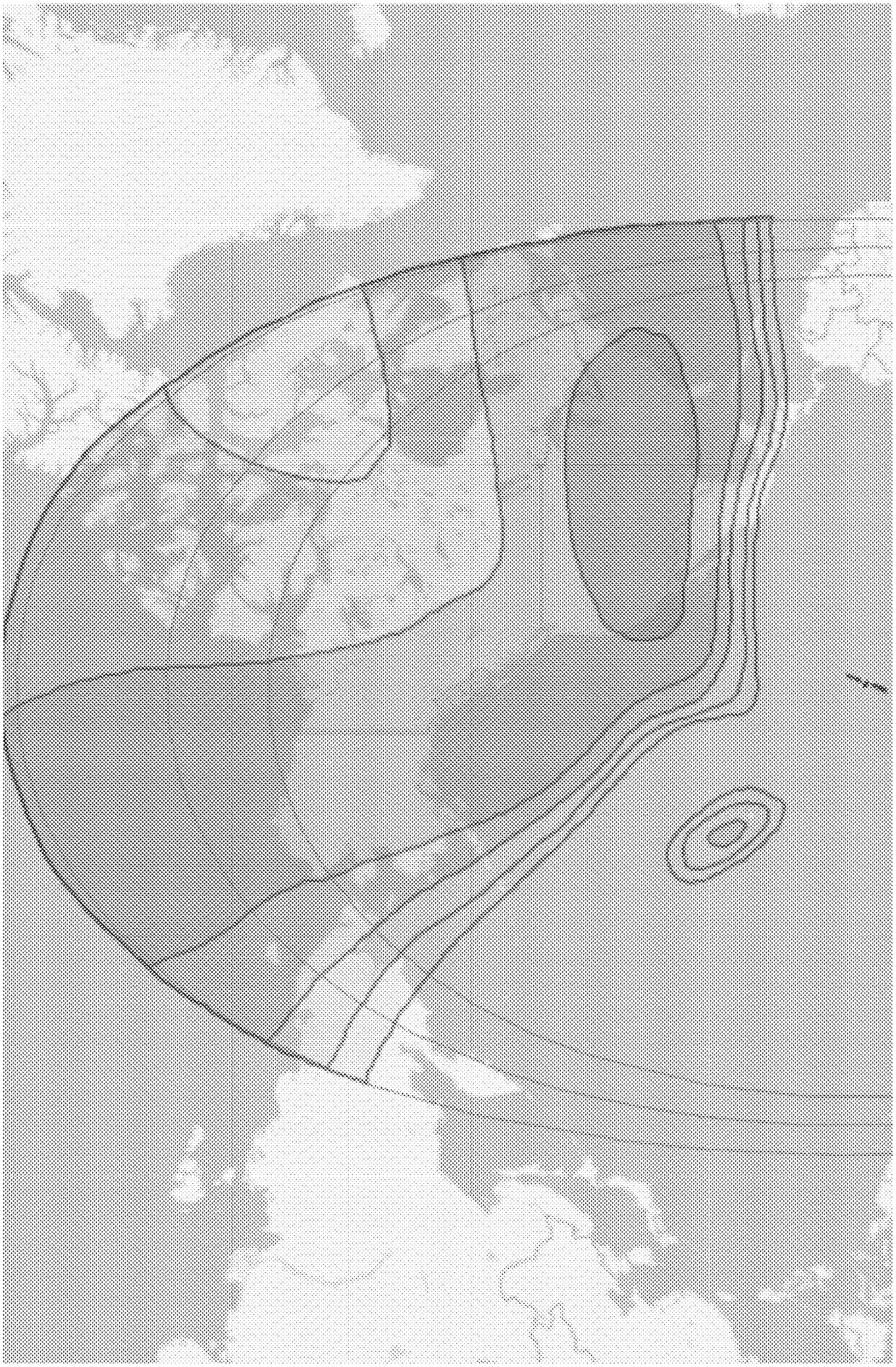
FIG. 1B illustrates the antenna gain of a specific satellite at different locations in North America.

In accordance with another embodiment, the system uses the determined transmission power that is required to communicate over the identified satellite, and also calculates the resulting power towards the direction in which the adversary is assumed (or known) to be. For example, even though the shortest path of the signal from the mobile device 105 to the ground station 140 may illustratively be via satellites 120 or 130, the system herein may identify that transmitting at slightly higher power towards satellite 110 would result in lower transmission power in the identified direction of the adversary 150. Alternatively or additionally, the system may identify that even though the gain of the satellite antennas of satellites 120 or 130 towards the location of the mobile device is higher than the gain of the antenna of satellite 110, the system herein may identify that transmitting at slightly higher power towards satellite 110 would result in lower transmission power in the identified direction of the adversary 150. The gain may be either calculated or obtained from various online resources (e.g., private and/or public database sites. For example, FIG. 1B provides the antenna gain of an example satellite "Galaxy 15" at different locations in the North American continent.

Figure 2:
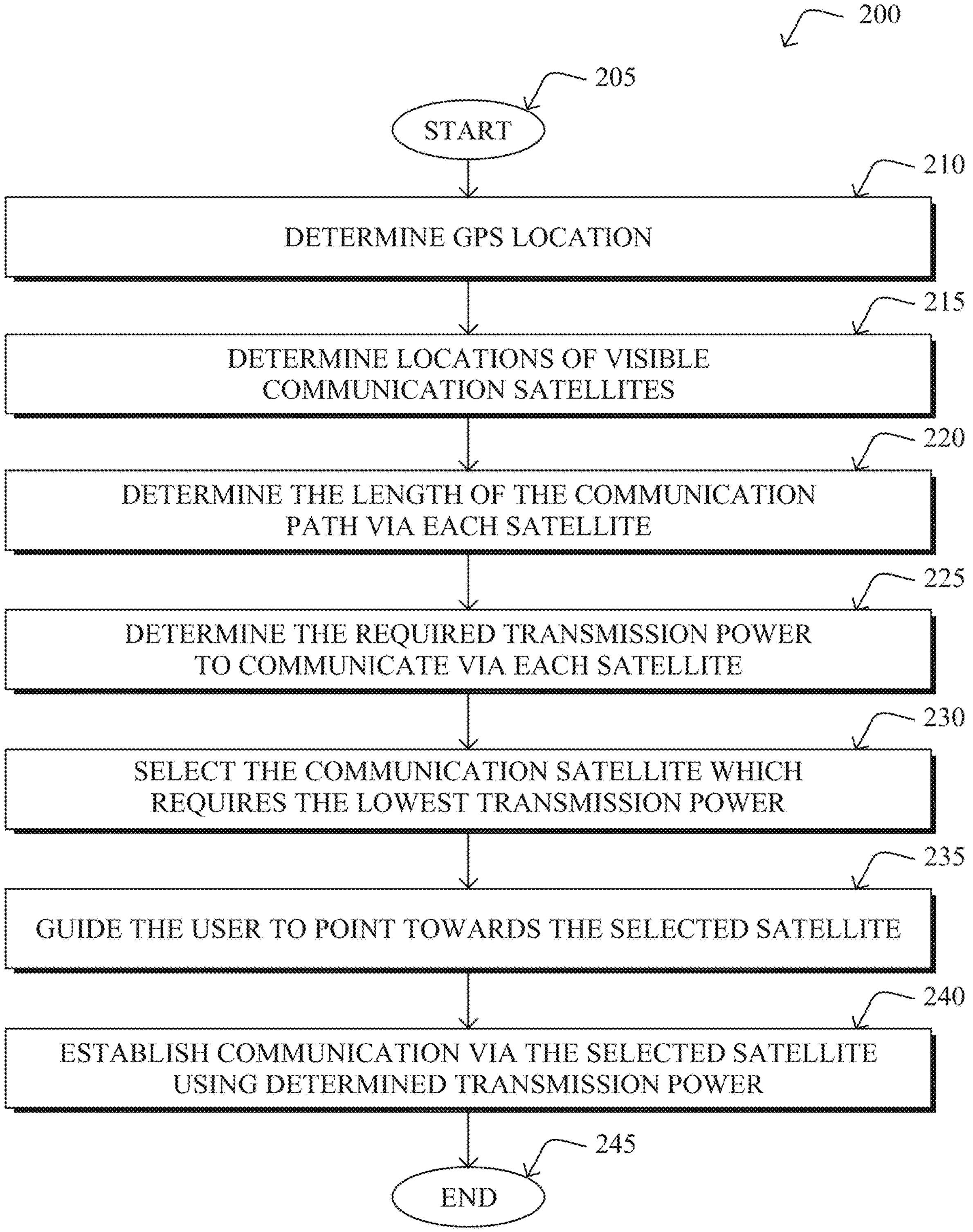
FIG. 2 illustrates an example simplified procedure for selecting a communication satellite and setting the transmission power in the absence of information about an adversary in accordance with one or more embodiments of the present disclosure.

FIG. 2 is an illustration of flowchart 200 for selecting a communication satellite and setting the transmission power in absence of information about an adversary.

The process starts at operation 205 and proceeds to operation 210 where the mobile device determines its location, e.g., by using a GPS system. In operation 215 the system determines the communication satellites that should be available to it based on its location, e.g., GPS location, and the specific time of the day. In according to a specific implementation, the topography of the location of the mobile device is taken into account to ensure that the line of sight towards the satellite is clear.

In operation 220 the length of communication path via each one of the communication satellites is determined. In accordance with another implementation, rather than determining the distance to the specific satellites, the system determines the gain of the antennas of the satellites towards the location of the mobile device. Operation 225 utilizes the length of communication paths via each one of the satellites (or alternatively the antenna gain of each satellite towards the location of the mobile device) to determine the required transmission power for ensuring reliable communication via each satellite.

Operation 230 selects the satellite which can facilitate communication using the lowest transmission power. In one example implementation, step 225 is not required and rather than determining the satellite which requires the lowest transmission power, the system simply determines the same satellite based on having the shortest communication path.

In operation 235 the mobile device guides the user to point the antenna of the device towards the selected satellite. This can be achieved either by a visual guidance or by voice instructions. Alternatively, where various mechanisms (e.g., gimbals, motors, etc.) are used to automatically aim the antenna, operation 235 comprises directing the antenna automatically towards the selected satellite, accordingly.

Once the antenna of the mobile device is directed towards the selected satellite, the mobile device establishes communication with satellite using the minimal required power in operation 240, and the procedure ends in operation 245.

Figure 3A:
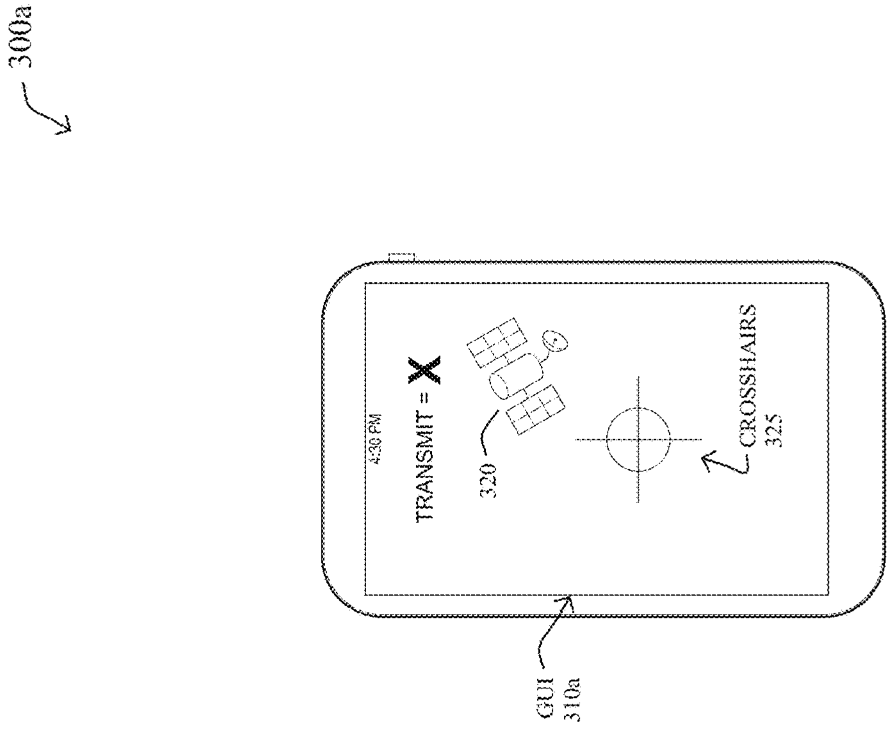
FIGS. 3A-3B illustrate example graphical user interfaces (GUIs) for precise antenna aiming towards a selected satellite in accordance with one or more embodiments of the present disclosure.
Figure 3B:
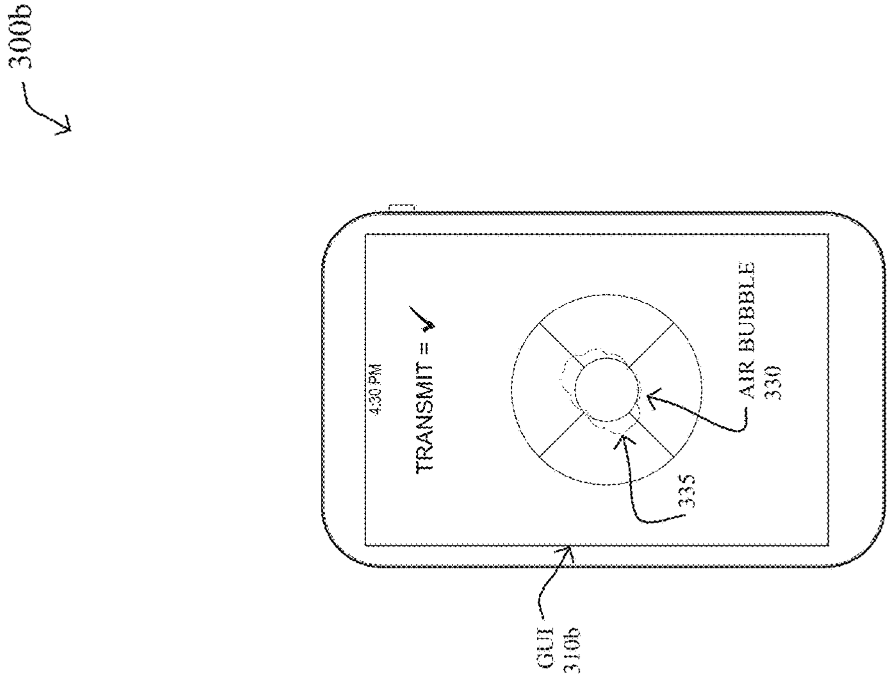
Figure 4:
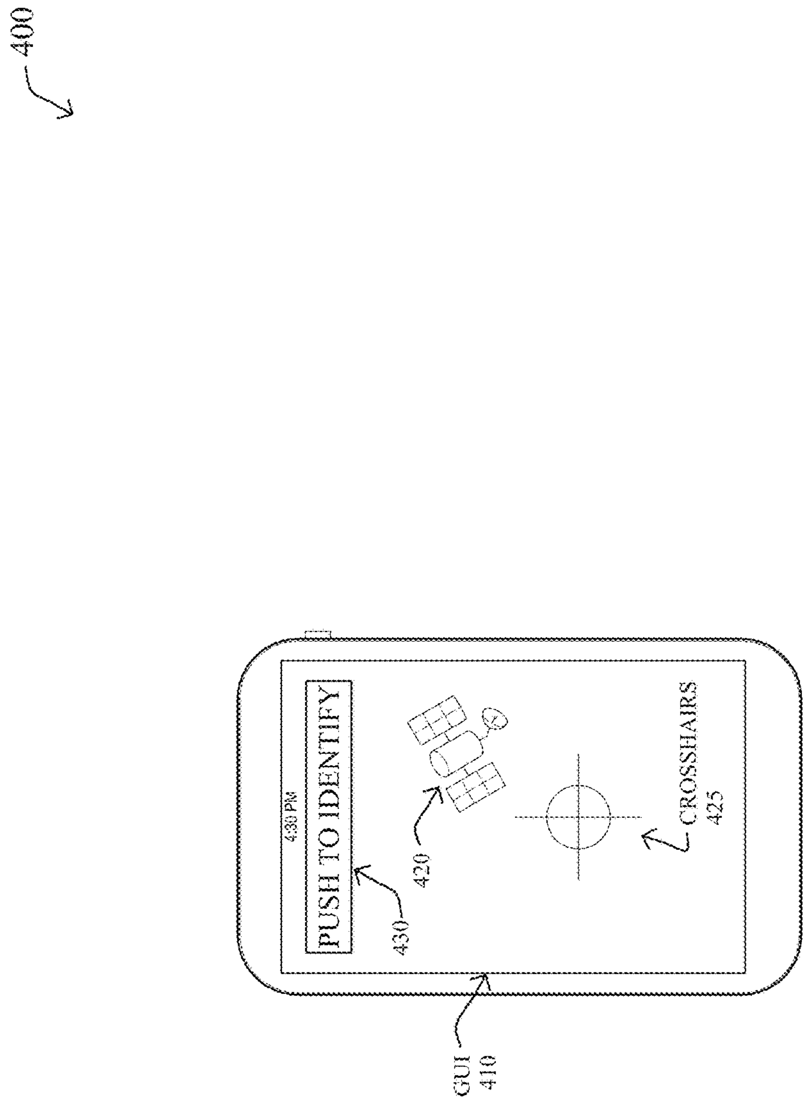
FIG. 4 illustrates an example user interface for identifying a direction towards a potential adversary in accordance with one or more embodiments of the present disclosure.

FIGS. 3A-3B illustrate examples of a GUI that may be used according to the techniques described above, particularly for user-based control of the directional antenna. In particular, FIG. 3A illustrates a first mobile device 300*a* with an example augmented reality (AR) like GUI display 310*a* with an AR satellite 320 and stationary "crosshairs" 325 to aim at the satellite, thus representing the desired direction to point the mobile device 300*a* (whether the satellite is actually located in that direction, or whether that merely represents the desired "aim" of the mobile device to direct the transmission or reception by the first/primary antenna according to the desired aim as described above). As the user changes the orientation of the antenna of the mobile device towards the selected satellite (e.g., as selected in flowchart 200 of FIG. 2 above), the icon of the selected satellite moves towards the center of the screen identified by the direction in which the antenna of the mobile device points. As shown, the mobile device is not pointing in the proper direction (i.e., the moving AR satellite 320 is not within the crosshairs 325 of the GUI 310*a*), and thus the mobile device should not (or in certain instances, cannot) transmit (or may not be able to receive the desired signals from the intended satellite).

Alternatively, FIG. 3B illustrates an example mobile device 300*b* with an "air bubble" 330 on GUI display 310*b* to guide a user to point the device to the desired angle. The direction of the mobile device antenna is illustrated by the circle in the middle of the screen 335, and as the user moves the orientation of the mobile device and points the antenna towards the selected satellite, the "air bubble" moves into the middle of the screen illustrating that the direction of the antenna is aligned towards the selected satellite. As shown in FIG. 3B, the illustrative air bubble 330 is "level" (within the circle 335), and as such, the terminal is appropriately aimed, and transmission and/or reception may commence.

Many other types of GUIs and functionalities may be conceived, and those shown herein are not meant to be limiting to the scope of the present disclosure.

According to the techniques herein, specifically, in response to a user pressing a "transmit" button (e.g., a soft button marked as "TRANSMIT" on the GUI 310*a* or 310*b* or other location) while the crosshairs or air bubble or other icon is aligned with the direction towards the selected satellite, the mobile device originates transmission towards the selected satellite using the minimal power that is required to ensure proper communication, as described above.

Notably, in other embodiments, such as where user intervention is not necessary for movement (e.g., automated terminals, drones/UAVs, weaponry, etc.), the antennas may be re-aimed, repositioned, moved, elevated, etc., based on locally directed or remotely directed commands according to the desired aim as described herein. That is, no user-based GUI would be necessary to ensure proper adjustment/aim, where sensors and/or controls internal to the device would sufficiently and autonomously adjust the orientation of the device, or more particularly, of the antenna, accordingly, and transmission towards the selected satellite may commence using the minimal power once proper alignment is achieved.

In accordance with one or more embodiments mentioned above, FIG. 4 is an example user interface 400 for identifying a direction towards a potential adversary. Graphical user interface (GUI) 410 includes an illustrative crosshair 425 which identifies the direction towards which the adversary is in relation to the aim of the user equipment (i.e., of the antenna or of a camera of the user equipment). An augmented reality (AR) view may include an image from a camera of the mobile device. An adversary 420 may be visible as shown, or not visible (just assumed to be in a specific direction, such as near a city, on a mountaintop, etc.). Though the icon shown illustrates a satellite, those skilled in the art should be able to recognize that the listening adversary may be an airborne device such as a receiver mounted on an airplane or on a drone, or a ground station. The location of the adversary may be static or in angular motion with respect to the location of the mobile device.

Notably, an internal computation between any angle/offset of the antenna of the user equipment and the angle of the associated camera may be made to account for the necessary adjustments between the GUI 410 and actual aiming of the antenna. In other words, similar to the transmit GUI in FIGS. 3A-3B, the adversary identification GUI may also need to account for the fact that a camera directly aimed at the adversary may not imply that the antenna also shares the same aim as the camera. As such, the crosshairs 425 may be adjusted to be offset appropriately from the center of the camera image such that the location of the crosshairs, when aimed at the desired location (e.g., an object or a direction), denote when the aim of the antenna would be toward the object/direction. Alternatively, the crosshairs may be centered within the camera image, and then a computation of the difference between the angles of the antenna and the camera may then be completed to determine the location of the of the adversary based on the antenna as opposed to the camera.

In accordance with one example implementation, the direction towards the adversary is a single static location. In this case the user aligns the crosshair with the direction towards the adversary and pushes the "PUSH TO IDENTIFY" soft button 430. As a result the direction towards the adversary is registered and stored for further use as described below in reference with flowchart 500 in FIG. 5. Multiple individual adversaries may be entered in this manner.

In accordance with yet another example implementation, the user may select (for sake of simplicity—not shown in the UI) a range determination. In accordance with this example, the user may push and hold the "PUSH TO IDENTIFY" soft button 430 and move the orientation of the mobile device as to cover the whole range of directions in which the adversary may be (either visible or hiding). When all of the directions were identified, the user lets go of the soft button. As a result, the range of directions towards the adversary is registered and stored for further use as described below in reference with flowchart 500.

In accordance with yet another example implementation the user may select (for sake of simplicity—not shown in the UI) a direction towards a moving target. In accordance with this example, the user may place the icon 425 on the moving adversary visible in the augmented reality screen and pushes the "PUSH TO IDENTIFY" soft button 430, moving the orientation of the mobile device as to follow the direction towards the adversary. When done, the user lets go of the soft button. As a result, the direction towards the adversary, including the angular motion of the adversary, are stored for further use as described below in reference with flowchart 500.

Figure 5:
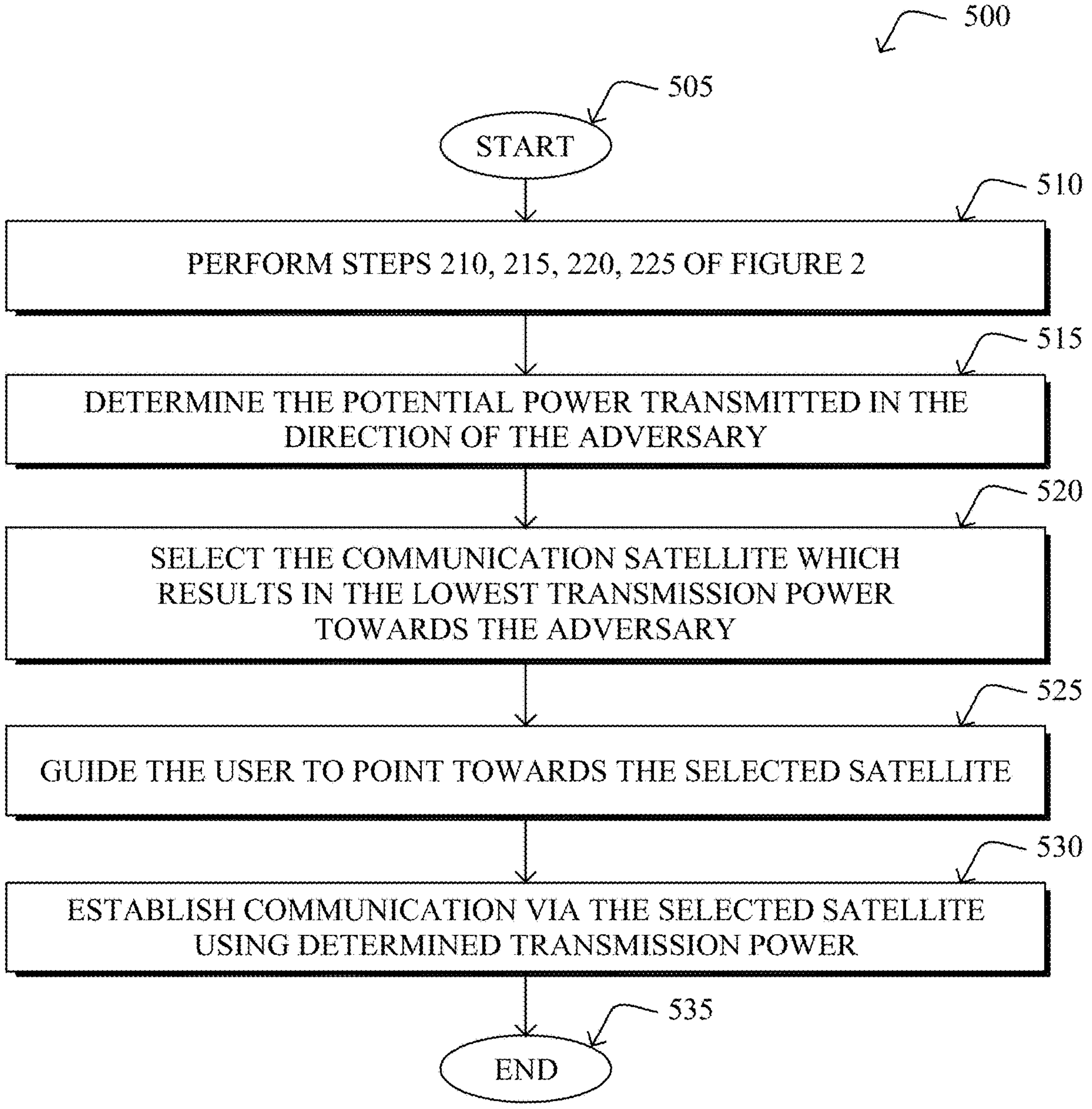
FIG. 5 illustrates an example simplified procedure for selecting a communication satellite and setting the transmission power in the presence of information about an adversary in accordance with one or more embodiments of the present disclosure.

FIG. 5 is an illustration of flowchart 500 for selecting a communication satellite and setting the transmission power in presence of information about an adversary.

The process starts at operation 505 and proceeds to operation 510 where the mobile device executes operations such as the operations described in FIG. 2 operations 210, 215, 220, and 225.

Operation 515 utilizes the shape of the lobe of the mobile device antenna and determines the power transmitted towards the assumed direction of the adversary while aiming the antenna towards each one of the prospective communication satellites and transmitting at the power that is required to ensure proper communication over the said satellite.

Operation 520 selects the communication satellite that results in the lowest transmission power in the assumed direction of the adversary.

Operation 525 the mobile device guides the user to point the antenna of the device towards the selected satellite. This can be achieved either by a visual guidance or by voice instructions. Alternatively, where various mechanisms (e.g., gimbals, motors, etc.) are used to automatically aim the antenna, operation 525 comprises directing the antenna automatically towards the selected satellite, accordingly.

Once the antenna of the mobile device is directed towards the selected satellite, the mobile device establishes communication with satellite using the minimal required power in operation 530, and the procedure ends in operation 535.

It should be noted that while certain steps within procedures 200 and 500 may be optional as described above, the steps shown in FIGS. 2 and 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may be described separately, certain steps from each procedure may be incorporated into each other procedure, and the procedures are not meant to be mutually exclusive.

Figure 6:
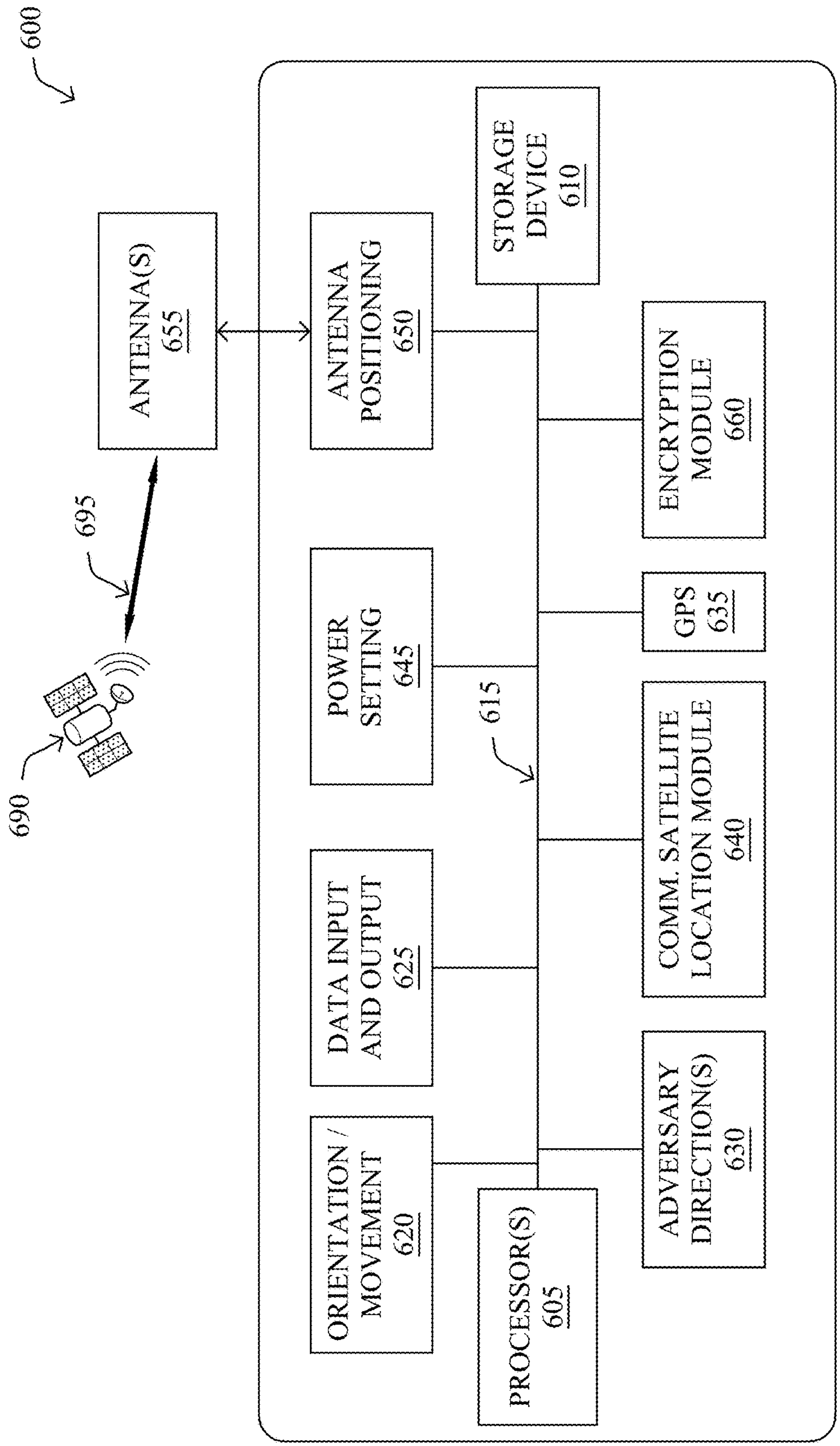
FIG. 6 illustrates a schematic block diagram of an example computing device (e.g., user equipment, mobile device, etc.) in accordance with one or more embodiments of the present disclosure.

FIG. 6 is a schematic block diagram of an example computing device/node (e.g., an apparatus) 600 that may be used with one or more embodiments described herein, e.g., as any of the devices shown or described herein (e.g., user equipment, a mobile device, a terminal, etc.) implementing the methods 200 and 500 as discussed in greater detail with reference to FIGS. 2 and 5 above.

The processor(s) 605 may be connected to the other components of the system via communication bus 615 which provides connectivity between the components of the device. Memory (storage device) 610 stores static and dynamic data including the software modules that implement the processes executed by the device. GPS module 635 helps determine the location of the device and computation module 640 determines the location of the various communication satellites. For GEO satellites, the location of the communication satellites is fixed and known in space. For other communication satellites, e.g., LEO or MEO satellites, the location is time varying and is calculated by module 640 rather than simply stored. The location (or the range of locations, and or angular motion) towards the adversary is stored by, e.g., the process described with respect to FIG. 4 or when known just entered, and stored in module 630. Orientation movement module 620 is used to identify the angular motion of an adversary, and in accordance with another example implementation it is used to guide the user to move the mobile device antenna (or moves the antenna automatically) in order to point in the direction that minimizes detection by the adversary.

Data input and output (I/O) module 625 is used to enter information such as configuration data and other information into the device. The module is also used to guide the user to point the antenna towards the selected satellite as well as for determining the direction of a potential adversary and its angular motion. In accordance with one example embodiment the direction in which the antenna 655 points is governed by antenna positioning module 650. The path towards the selected satellite 690 is illustrated by the line of sight 695. The transmission power setting is determined by module 645 based on the length of the transmission path utilizing the selected satellite such as one of satellites 110, 120, or 130 of FIG. 1A.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Advantageously, the techniques herein thus provide for determining the transmission power for a mobile device. In particular, in one embodiment, an illustrative method herein may comprise: determining, by a mobile device and based on a location of the mobile device, one or more satellites available to facilitate communication between the mobile device and a ground station; selecting, by the mobile device, a particular satellite from the one or more satellites based on one or more transmission power selection factors; determining, by the mobile device, a minimal transmission power required for reliable communication via the particular satellite; pointing, by the mobile device, an antenna of the mobile device towards the particular satellite; and establishing, by the mobile device, communication to the ground station over the particular satellite using the minimal transmission power.

In one embodiment, the one or more transmission power selection factors are based on determining which given satellite of the one or more satellites that can facilitate communication using a lowest transmission power.

In one embodiment, the one or more transmission power selection factors are based on determining a given satellite of the one or more satellites that corresponds to a lowest received power at a potential adversarial device when transmitting a signal by the mobile device towards the given satellite at the minimal transmission power. In one embodiment, determining the given satellite is based on: determining a given transmission power that facilitates reliable communication over the given satellite; determining a gain of the antenna of the mobile device towards a direction of the potential adversarial device; and determining the given satellite based on a measure of the given transmission power and the gain of the antenna.

In one embodiment, the method further comprises: identifying a location of a potential adversary device; calculating a resulting power towards a direction of the location of the potential adversary device for the one or more satellites; and selecting the particular satellite based on minimizing the resulting power towards the direction of the location of the potential adversary device. In one embodiment, the particular satellite requires a higher minimal transmission power than one or more other satellites of the one or more satellites. In one embodiment, the potential adversary device is selected from a group consisting of: a drone; a satellite; an airborne device; an airplane; a user device; and ground-based listening equipment. In one embodiment, the method further comprises: receiving, by the mobile device, user input for the location of the potential adversary device.

In one embodiment, selecting the particular satellite is based on a length of a communication path between the mobile device and the ground station via the particular satellite. In one embodiment, the method further comprises: determining a length of respective communication paths from the mobile device to a corresponding ground station via the one or more satellites by: determining a location of the mobile device; determining a respective location of the one or more satellites; and calculating a first distance between the mobile device towards a respective satellite plus a second distance from the respective satellite to the corresponding ground station.

In one embodiment, determining the minimal transmission power required for reliable communication via the particular satellite comprises: determining overall path loss based on a gain of the antenna of the mobile device and a gain of the particular satellite towards a location of the mobile device; determining a sensitivity of a receiver of the ground station; and calculating the minimal transmission power required based on the overall path loss and to ensure proper power at the receiver of the ground station based on the sensitivity of the receiver.

In one embodiment, selecting the particular satellite is based on a respective gain of corresponding antennas of the one or more satellites toward the mobile device. In one embodiment, the method further comprises: storing, in a memory of the mobile device, the respective gain of corresponding antennas of the one or more satellites towards one or more locations of interest; determining a location of the mobile device; correlating the location of the mobile device to a particular location of interest of the one or more locations of interest; and determining the respective gain of corresponding antennas of the one or more satellites towards the particular location of interest. In one embodiment, the method further comprises: determining a respective location of the one or more satellites; determining a respective direction each of the one or more satellites points a corresponding antenna towards earth; determining a location of the mobile device; determining the one or more satellites based on the location of the mobile device, respective location of the one or more satellites, and the respective direction each of the one or more satellites points a corresponding antenna towards earth; and determining a respective gain of the corresponding antenna of the one or more satellites towards the location of the mobile device.

In one embodiment, determining the minimal transmission power required for reliable communication via the particular satellite comprises: determining a first gain of the antenna of the mobile device; determining a second gain of an antenna of the particular satellite towards a location of the mobile device; determining a sensitivity of a receiver of the particular satellite; and calculating the minimal transmission power required based on the first gain and second gain to ensure proper power at the receiver of the particular satellite based on the sensitivity of the receiver.

In one embodiment, pointing the antenna of the mobile device towards the particular satellite comprises: providing a user interface to guide a user to point the antenna of the mobile device towards the particular satellite. In one embodiment, the method further comprises: removing any options from the user interface for communication with any of the one or more satellites other than the particular satellite.

In one embodiment, pointing the antenna of the mobile device towards the particular satellite comprises: mechanically orienting the antenna of the mobile device by controlling one or more gimbals for the antenna of the mobile device and/or orienting the mobile device to correspondingly orient the antenna of the mobile device.

Additionally, an illustrative tangible, non-transitory, computer-readable medium herein may store program instructions that cause a computer of a mobile device to execute a method comprising: determining, based on a location of the mobile device, one or more satellites available to facilitate communication between the mobile device and a ground station; selecting a particular satellite from the one or more satellites based on one or more transmission power selection factors; determining a minimal transmission power required for reliable communication via the particular satellite; pointing an antenna of the mobile device towards the particular satellite; and establishing communication to the ground station over the particular satellite using the minimal transmission power.

Moreover, an illustrative apparatus herein may comprise: a processor configured to execute one or more processes; a communication interface configured to communicate via one or more satellite antennas associated with the apparatus; and a memory configured to store a process executable by the processor that when executed is configured to: determine, and based on a location of the apparatus, one or more satellites available to facilitate communication between the apparatus and a ground station; select a particular satellite from the one or more satellites based on one or more transmission power selection factors; determine a minimal transmission power required for reliable communication via the particular satellite; point the one or more satellite antennas associated with the apparatus towards the particular satellite; and establish communication to the ground station over the particular satellite using the minimal transmission power.

While there have been shown and described illustrative embodiments, it is to be understood that various other adaptations and modifications may be made within the scope of the embodiments herein. For example, the embodiments may, in fact, be used in a variety of types of wireless communication networks and/or protocols, and need not be limited to the illustrative satellite network implementation. Furthermore, while the embodiments may have been demonstrated with respect to certain communication environments, physical environments, or device form factors, other configurations may be conceived by those skilled in the art that would remain within the contemplated subject matter of the description above.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In particular, the foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

determining, by a mobile device and based on a location of the mobile device, one or more satellites available to facilitate communication between the mobile device and a ground station;

selecting, by the mobile device, a particular satellite from the one or more satellites based on one or more transmission power selection factors;

determining, by the mobile device, a minimal transmission power required for reliable communication via the particular satellite to the ground station, wherein the minimal transmission power is calculated based on a gain of an antenna of the mobile device, a gain of an antenna of the particular satellite, and a receiver sensitivity of the ground station;

pointing, by the mobile device, an antenna of the mobile device towards the particular satellite; and establishing, by the mobile device, communication to the ground station over the particular satellite using the minimal transmission power.

2. The method as in claim 1, wherein the one or more transmission power selection factors are based on determining which given satellite of the one or more satellites that can facilitate communication using a lowest transmission power.

3. The method as in claim 1, wherein the one or more transmission power selection factors are based on determining a given satellite of the one or more satellites that corresponds to a lowest received power at a potential adversarial device when transmitting a signal by the mobile device towards the given satellite at the minimal transmission power.

4. The method as in claim 3, wherein determining the given satellite is based on:

determining a given transmission power that facilitates reliable communication over the given satellite;

determining a gain of the antenna of the mobile device towards a direction of the potential adversarial device; and determining the given satellite based on a measure of the given transmission power and the gain of the antenna.

5. The method as in claim 1, further comprising:

identifying a location of a potential adversary device;

calculating a resulting power towards a direction of the location of the potential adversary device for the one or more satellites; and selecting the particular satellite based on minimizing the resulting power towards the direction of the location of the potential adversary device.

6. The method as in claim 5, wherein the particular satellite requires a higher minimal transmission power than one or more other satellites of the one or more satellites.

7. The method as in claim 5, wherein the potential adversary device is selected from a group consisting of: a drone; a satellite; an airborne device; an airplane; a user device; and ground-based listening equipment.

8. The method as in claim 5, further comprising:

receiving, by the mobile device, user input for the location of the potential adversary device.

9. The method as in claim 1, wherein selecting the particular satellite is based on a length of a communication path between the mobile device and the ground station via the particular satellite.

10. The method as in claim 9, further comprising:

determining a length of respective communication paths from the mobile device to a corresponding ground station via the one or more satellites by:

determining a location of the mobile device;

determining a respective location of the one or more satellites; and calculating a first distance between the mobile device towards a respective satellite plus a second distance from the respective satellite to the corresponding ground station.

11. The method as in claim 1, wherein determining the minimal transmission power required for reliable communication via the particular satellite comprises:

determining overall path loss based on a gain of the antenna of the mobile device and a gain of the particular satellite towards a location of the mobile device;

determining a sensitivity of a receiver of the ground station; and calculating the minimal transmission power required based on the overall path loss and to ensure proper power at the receiver of the ground station based on the sensitivity of the receiver.

12. The method as in claim 1, wherein selecting the particular satellite is based on a respective gain of corresponding antennas of the one or more satellites toward the mobile device.

13. The method as in claim 12, further comprising:

storing, in a memory of the mobile device, the respective gain of corresponding antennas of the one or more satellites towards one or more locations of interest;

determining a location of the mobile device;

correlating the location of the mobile device to a particular location of interest of the one or more locations of interest; and determining the respective gain of corresponding antennas of the one or more satellites towards the particular location of interest.

14. The method as in claim 12, further comprising:

determining a respective location of the one or more satellites;

determining a respective direction each of the one or more satellites points a corresponding antenna towards earth;

determining a location of the mobile device;

determining the one or more satellites based on the location of the mobile device, respective location of the one or more satellites, and the respective direction each of the one or more satellites points a corresponding antenna towards earth; and determining a respective gain of the corresponding antenna of the one or more satellites towards the location of the mobile device.

15. The method as in claim 1, wherein determining the minimal transmission power required for reliable communication via the particular satellite comprises:

determining a first gain of the antenna of the mobile device;

determining a second gain of an antenna of the particular satellite towards a location of the mobile device;

determining a sensitivity of a receiver of the particular satellite; and calculating the minimal transmission power required based on the first gain and second gain to ensure proper power at the receiver of the particular satellite based on the sensitivity of the receiver.

16. The method as in claim 1, wherein pointing the antenna of the mobile device towards the particular satellite comprises:

providing a user interface to guide a user to point the antenna of the mobile device towards the particular satellite.

17. The method as in claim 16, further comprising:

removing any options from the user interface for communication with any of the one or more satellites other than the particular satellite.

18. The method as in claim 1, wherein pointing the antenna of the mobile device towards the particular satellite comprises:

mechanically orienting the antenna of the mobile device by controlling one or more gimbals for the antenna of the mobile device and/or orienting the mobile device to correspondingly orient the antenna of the mobile device.

19. A tangible, non-transitory, computer-readable medium storing program instructions that cause a computer of a mobile device to execute a method comprising:

determining, based on a location of the mobile device, one or more satellites available to facilitate communication between the mobile device and a ground station;

selecting a particular satellite from the one or more satellites based on one or more transmission power selection factors;

determining a minimal transmission power required for reliable communication via the particular satellite to the ground station, wherein the minimal transmission power is calculated based on a gain of an antenna of the mobile device, a gain of an antenna of the particular satellite, and a receiver sensitivity of the ground station;

pointing an antenna of the mobile device towards the particular satellite; and establishing communication to the ground station over the particular satellite using the minimal transmission power.

20. An apparatus, comprising:

a processor configured to execute one or more processes;

a communication interface configured to communicate via one or more satellite antennas associated with the apparatus; and a memory configured to store a process executable by the processor that when executed is configured to:

determine, and based on a location of the apparatus, one or more satellites available to facilitate communication between the apparatus and a ground station;

select a particular satellite from the one or more satellites based on one or more transmission power selection factors;

determine a minimal transmission power required for reliable communication via the particular satellite to the ground station, wherein the minimal transmission power is calculated based on a gain of an antenna of the apparatus, a gain of an antenna of the particular satellite, and a receiver sensitivity of the ground station;

point the one or more satellite antennas associated with the apparatus towards the particular satellite; and establish communication to the ground station over the particular satellite using the minimal transmission power.

* * * * *